(12) United States Patent
Kraiem et al.

(10) Patent No.: US 6,370,369 B1
(45) Date of Patent: Apr. 9, 2002

(54) NETWORK DEVICE AND METHOD EMPLOYING OMNI-DIRECTIONAL AND DIRECTIONAL ANTENNAS

(75) Inventors: Besma Kraiem, Fellbach; Janos Enderlein, Stuttgart; Markus Zumkeller, Schwaikheim, all of (DE)

(73) Assignee: Sony International (Europe) GmbH, Berlin (DE)

(*) Notice: Subject to any disclaimer, the term of this patent is extended or adjusted under 35 U.S.C. 154(b) by 0 days.

(21) Appl. No.: 09/599,338

(22) Filed: Jun. 22, 2000

(30) Foreign Application Priority Data

Jun. 23, 1999 (EP) .............................. 99112131

(51) Int. Cl.$^7$ .............................. H04B 1/06; H04B 7/00
(52) U.S. Cl. ...................... 455/277.1; 455/101; 375/267
(58) Field of Search .............................. 455/101, 277.2, 455/277.1, 423; 375/347, 267

(56) References Cited

U.S. PATENT DOCUMENTS

| 4,369,520 A | 1/1983 | Cerny, Jr. et al. |
| 5,175,878 A | * 12/1992 | Davis .......................... 455/103 |
| 5,828,658 A | 10/1998 | Ottersten et al. |

FOREIGN PATENT DOCUMENTS

| EP | 0 622 911 | 11/1994 |
| GB | 2 298 338 | 8/1996 |

OTHER PUBLICATIONS

ETSI HIPERLAN/2 Standard, Sep. 5, 2000 [retrieved on Apr. 16, 2001]. Retrieved from the internet: <URL: http://www.etsi.org/technicalactiv/hiperlan2.htm>.*

Wei–Lin Liu et al: "Advanced Low–Complexity Hiperlan Receiver Using Combined Antenna Switoching Diversity and Simple Equaliser", 1997 IEEE 47th Vehiculuar Technology Conf., May 4–7, 1997, vol. 3, No. 47, pp. 2037–2041, XP002101330.

* cited by examiner

Primary Examiner—Vivian Chang
Assistant Examiner—James Moore
(74) Attorney, Agent, or Firm—Frommer Lawrence & Haug LLP; William S. Frommer; Glenn F. Savit

(57) ABSTRACT

Performing an antenna diversity set-up according to the present invention a first mobile terminal (1) transmits a pre-defined antenna calibration signal to a second mobile terminal (15) using its omni-directional antenna (10). During the period of the transmitted signal the best receiving antenna (x) is identified at the second mobile terminal (15) by switching all its directional antennas (21 to 28) and its omni-directional antenna (20) into its receiving path and measuring the received signal quality, e.g. the received signal strength. The directional antenna (x) of the second network device (15) which is identified as best receiving antenna is then used for transmission and reception of data transfer with the first network device (1). Using this antenna, the second network device (15) transmits its pre-defined calibration signal to the first network device (1) which repeats a similar switching and measuring procedure with its directional antennas (11 to 14) and its omni-directional antenna (10) to identify its best receiving antenna (y). These two antennas (x, y) identified at the second network device (15) and the first network device (1) are then used for direct data transfer in-between these both devices. This inventive method is preferably used in direct mode within an IEEE 1394 based HIPERLAN type 2 wireless network.

6 Claims, 3 Drawing Sheets

– – –  Direct Mode
———  Up- and Downlink

NETWORK DEVICE AND METHOD EMPLOYING OMNI-DIRECTIONAL AND DIRECTIONAL ANTENNAS

DESCRIPTION

The present invention relates to transmit and receiving antenna diversity in wireless networks, in particular in wireless networks with direct mode, i.e. the possibility that network devices, e.g. mobile terminals, directly communicate with each other without using a central station or access point as repeater.

Figure 3:
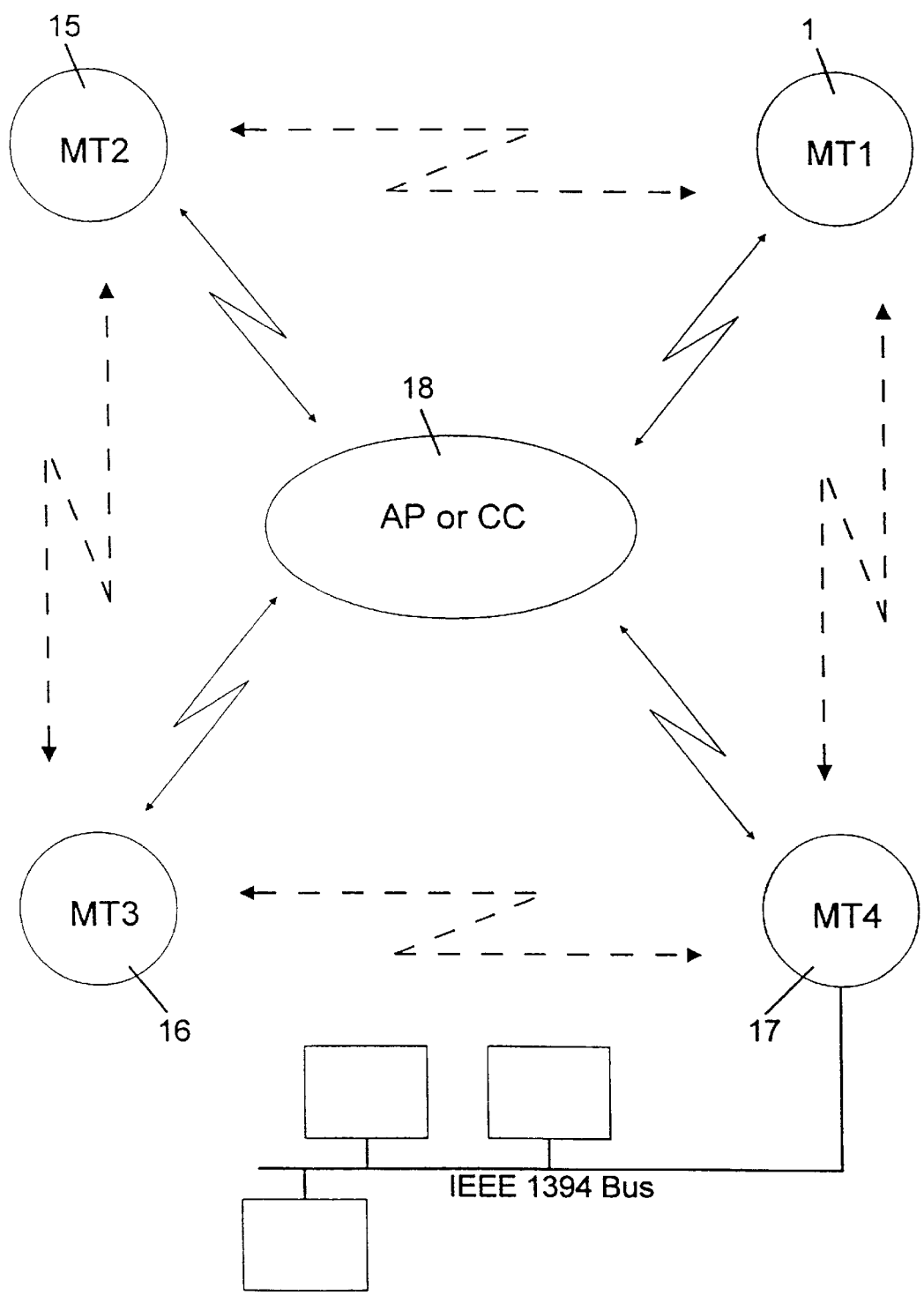

An exemplary wireless network is shown in FIG. 3. Generally, mobile terminals in wireless networks, such as the IEEE 1394 based HIPERLAN type 2 network which is developed under supervision of ETSI comprise several different directed antennas to be able to perform a receiving antenna diversity in regard to the central controller or access point 18. In this case the receiver of a mobile terminal 1, 15, 16, 17 determines the best receiving antenna during a downlink period of a communication with the central controller or access point 18 and the transmitter of said mobile terminal uses the same antenna during an uplink period. An IEEE 1394 bus with connected network devices is exemplary shown only for the fourth mobile terminal 17.

The state of the art on both transmit and receiving antenna diversity in wireless networks with direct mode is performed by switching between all transmit and receiving antennas in order to assess the provided radio link quality in all possible cases. In case a first mobile terminal having a medium access control identifier, i.e. MAC-ID, MT1 comprises N directed transmit and receiving antennas and a second mobile terminal having medium access control identifier MT2 comprises M directed transmit and receiving antennas there is the need to perform N·M measurements until the best antenna pair is identified, since for each of the N directed transmit antennas of the first mobile terminal with MAC-ID MT1 all M receiving antennas of the second mobile terminal with MAC-ID MT2 have to be switched through to determine the antenna pair having the best performance. These N·M measurements need a rather long time when considering systems with a bigger number of transmitting and receiving antennas, e.g. 8 antennas per mobile terminal.

Therefore, it is the object of the present invention to reduce the time to identify the best antenna pair in case of transmit and receiving antenna diversity.

This object is solved with a method to perform a transmit and receiving antenna diversity in-between a first network device and a second network device of a wireless network according to independent claim 1, a network device within a wireless network which is comprising a number of directional antennas according to independent claim 4 and an antenna calibration signal according to independent claim 11. Preferred embodiments thereof are respectively defined in the dependent subclaims.

According to the present invention a network device of a wireless network, such as a mobile terminal of an IEEE1394 based HIPERLAN type 2 network, which comprises a number of directional antennas to perform antenna diversity additionally comprises an omni-directional antenna.

Therewith, to perform a transmit and receiving antenna diversity in-between first and second of such network devices according to the present invention the following steps are performed:

using the omni-directional antenna of the first network device to transmit a calibration signal from the first network device to the second network device;

identifying the best receiving antenna of the second network device by successively switching all directional antennas and the omni-directional antenna of the second network device into its receiving path and respectively measuring the received signal quality, and setting said identified best receiving antenna as transmit and receiving antenna of said second network device;

using the set transmit and receiving antenna of said second network device to transmit a calibration signal from the second network device to the first network device; and identifying the best receiving antenna of the first network device by successively switching all directional antennas and the omni-directional antenna of the first network device into its receiving path and respectively measuring the received signal quality, and setting said identified best receiving antenna as transmit and receiving antenna of said first network device.

Therewith, according to the present invention the amount of measurements needed to be performed until the best antenna pair is identified is reduced to N+M+2 in case the first network device comprises N directional antennas and 1 omni-directional antenna and the second network device comprises M directional antennas and 1 omni-directional antenna.

Said omni-directional antenna of a network device according to the present invention is preferably separate from the directional antennas, but according to a further preferred embodiment of the present invention it is also possible that said omni-directional antenna is built by a parallel connection of several or all of said directional antennas.

This further preferred embodiment according to the present invention has the advantage that existing network devices can easily be adapted to the inventive method without considerable changes in hardware, but by mainly providing the new control method for antenna diversity according to the present invention.

An antenna calibration signal that is to be used in the inventive method to perform a transmit and receiving antenna diversity with a network device according to the present invention is characterized in that a signal is used which is already available within the mobile terminal.

Therefore, no additional memory space is needed to store the calibration signal according to the present invention.

Preferably one or more B16 quarter symbols are used to compose the antenna calibration signal, wherein a B16 is a quarter symbol within a BCCH/uplink preamble according to the IEEE1394 based HIPERLAN type 2 network.

The use of this signal inherits the advantage that the peak to average power ratio and dynamic range is low.

Of course, the calibration signal has to be transmitted during the whole time of switching through all available antennas of the respective receiving network device and it has to be homogeneous over its signal period.

Figure 1:
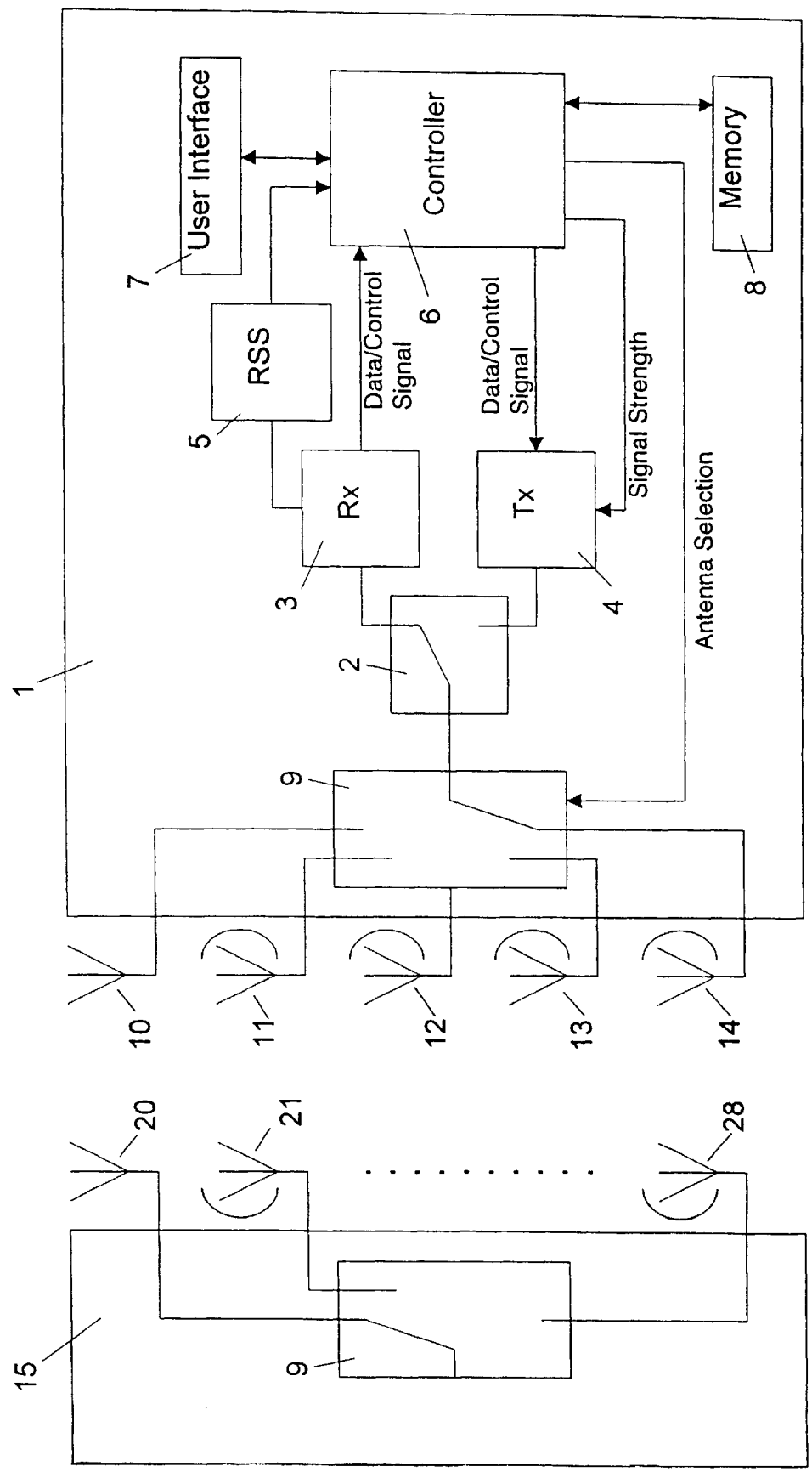
Figure 2:
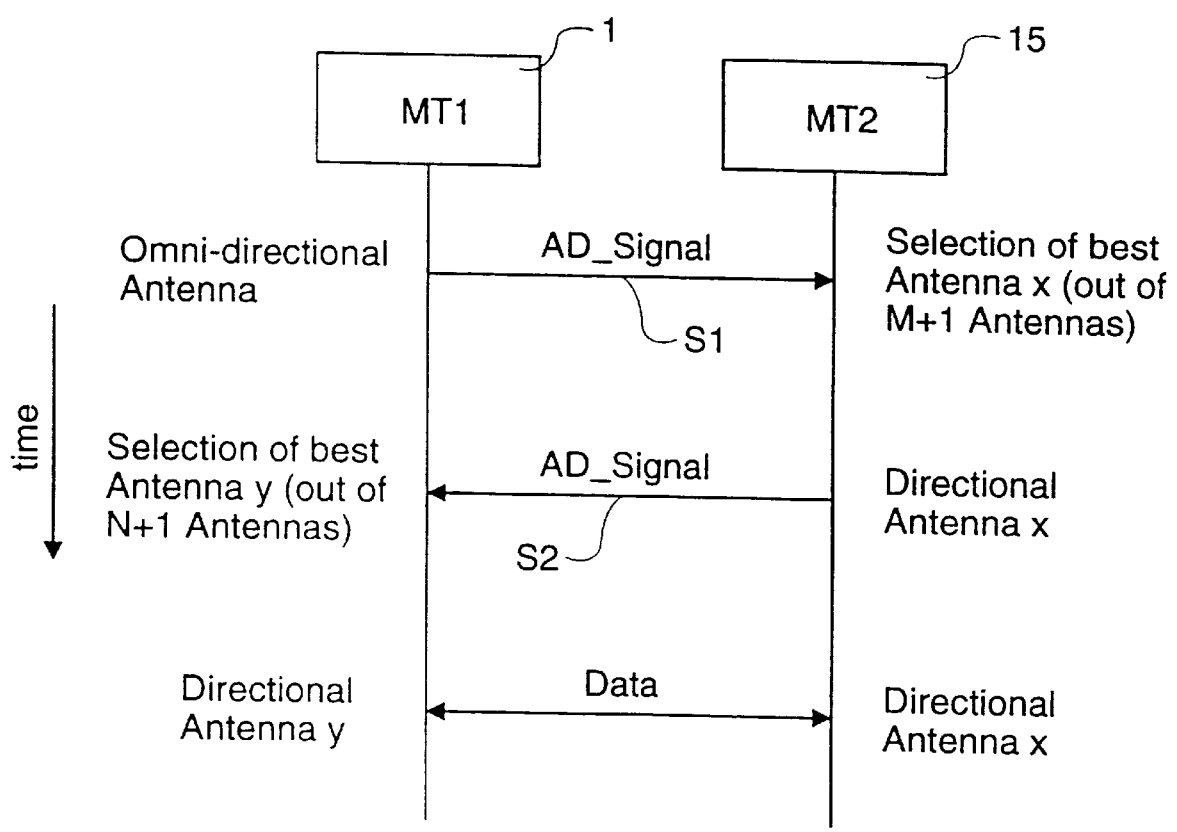

The present invention and its numerous embodiments will be better understood from the following detailed description of an exemplary preferred embodiment thereof taken in conjunction with the accompanying drawings, in which FIG. 1 shows two mobile terminals of an IEEE 1394 HIPERLAN type 2 network adapted according to the present invention;

FIG. 2 shows the antenna diversity set-up in direct mode for both mobile terminals shown in FIG. 1; and FIG. 3 shows an exemplary IEEE 1394 based HIPERLAN type 2 network.

FIG. 1 shows that the first mobile terminal 1 having the medium access control identifier, i.e. MAC-ID, MT1 has N=4 directional antennas 11 to 14 and one omni-directional antenna 10 which are connected via a switching unit 9 to the movable terminal of a transmit/receive selection switch 2 which fixed terminals are respectively connected to the transmitter and receiver signal path of the mobile terminal 1. In the receiver signal path a receiver 3 is directly connected to the respective fixed terminal of the transmit/receive selection switch 2. This receiver 3 produces a data and control signal input to a controller 6 and also outputs a signal wherefrom a signal quality measurement unit 5 can determine the received signal strength which is output to the controller 6. For the transmitter signal path the controller 6 outputs a data and control signal to a transmitter 4 which modulates, up-converts and amplifies this signal to a given signal strength which is indicated to the transmitter 4 by a control signal generated by the controller 6 and outputs the generated transmission signal to the respective fixed terminal of the transmit/receive selection switch 2. Bi-directionally connected to the controller are a user interface 7 and a memory 8. Furtheron, the controller 6 outputs a antenna selection signal to the switching unit 9.

The second mobile terminal 15 having a medium access control identifier MT2 ooks identical to the first mobile terminal 1 apart from the fact that it comprises M=8 directional antennas 21 to 28 and one omni-directional antenna 20 which are respectively connected to the switching unit 9.

In the following the antenna diversity set-up in direct mode between the first mobile terminal 1 having the medium access control identifier MT1 and the second mobile terminal 15 having the medium access control identifier MT2 is explained in connection with FIG. 2.

For example, after the direct mode connection set-up and a transmit power control the access point/central controller 18 grants resources for the peer mobile terminals, i.e. the first mobile terminal 1 and the second mobile terminal 15, to perform antenna diversity selection. Therefore, using its omni-directional antenna 10, the first mobile terminal 1 with MAC-ID MT1 transmits an antenna diversity calibration signal, in the following AD_signal, to the second mobile terminal 15 with MAC-ID MT2 in a first step S1.

During the period of the transmitted signal the best receiving antenna is identified at the second mobile terminal 15 with MAC-ID MT2, by switching the M=8 directional antennas 21 to 28 and the omni-directional antenna 20 into the receiving path and then measuring the received signal quality, e.g. the received signal strength RSS. The directional antenna x at the second mobile terminal 15 with MAC-ID MT2 which is identified as best receiving antenna, e.g. the first directional antenna 21 of the second mobile terminal 15, is then used for transmission and reception of direct mode transfer with the first mobile terminal 1 with MAC-ID MT1. Using this antenna the second mobile terminal transmits its AD-signal to the first mobile terminal 1 in a second step S2.

The first mobile terminal 1 performs a similar switching and measuring procedure with its M=4 directional antennas 11 to 15 and its omni-directional antenna 10 to identify its best receiving antenna y, e.g. the second antenna 12 of the first mobile terminal 1. These two antennas y and x identified at the first mobile terminal 1 and the second mobile terminal 15 are then used for data transfer in direct mode in-between these both mobile terminals.

Basically, the numbers N and M of directional antennas depend on the system used, preferably N=M≦8 directional antennas are used.

In the following the requirements of the antenna calibration signal are listed and explained:

the length of the signal has to be sufficient for switching and measuring the maximum number of antennas used within a mobile terminal, the strength of the signal has to be homogenous over its signal period, the peak to average power ratio and dynamic range has to be low, and in order to avoid additional space for the signal storage a signal shall be applied which is already available.

Of course, depending on the needs of the system not all of these 4 items have to be fulfilled simultaneously.

As mentioned above, the best antenna arrangement will be found by subsequently switching of all antennas into the receiving path and measuring of the signal strength. Table 1 below contains an estimation of the time (specified in parts of a symbol length for the IEEE1394 based HIPERLAN type 2 network) needed for measurement of the signal and switching from one antenna to the next.

TABLE 1

Length of the antenna calibration signal for one antenna

| Function | Symbol |
| --- | --- |
| Signal collection and energy integration over antenna n | ¾ |
| Setting-up a switching to antenna n + 1 | ¼ |

As shown in Table 1, for the measurement and switching of one antenna a time of approximately one OFDM symbol, i.e. 3,2 $\mu$s, is needed, wherefore for N=8 directional antennas and one omni-directional antenna a calibration signal with a length of 9 symbols=28,8 $\mu$s is necessary.

Preferably each of these 9 OFDM symbols is composed by 4 quarter symbols as they have been introduced for the BCCH/uplink preamble within the IEEE1394 based HIPERLAN type 2 standard. As required, the time domain waveform of the B16 symbols achieves a low peak to average power ratio and a small dynamic range. Therefore, it is preferred to use B16 symbols to compose the antenna calibration signal.

Of course, the present invention is not limited to IEEE1394 and also not to HIPERLAN type 2. In general, any wireless network and network devices within such a network supporting antenna diversity are applicable to the present invention. Also, the present invention is not limited to direct mode only, it is also thinkable that antenna diversity according to the present invention can be performed in-between a mobile terminal and the central controller/access point.

What is claimed is:

1. Method to perform a transmit and receiving antenna diversity in-between a first network device (1) and a second network device (15) of a wireless network, characterized by the following steps:

using an omni-directional antenna (10) of the first network device (1) to transmit a calibration signal from the first network device (1) to the second network device (15);

identifying the best receiving antenna (x) of the second network device (15) by successively switching all directional antennas (21 to 28) and an omni-directional antenna (20) of the second network device (15) into its receiving path and respectively measuring the received signal quality, and setting said identified best receiving antenna (x) as transmit and receiving antenna of said second network device (15);

using the set transmit and receiving antenna (x) of said second network device (15) to transmit a calibration signal from the second network device (15) to the first network device (1); and identifying the best receiving antenna (y) of the first network device (1) by successively switching all directional antennas (11 to 14) and said omni-directional antenna (10) of the first network device (1) into its receiving path and respectively measuring the received signal quality, and setting said identified best receiving antenna (y) as transmit and receiving antenna of said first network device (1).

2. Method according to claim 1, characterized in that said wireless network is an IEEE 1394 based HIPERLAN type 2 network.

3. Method according to claim 1, characterized in that said network device is a mobile terminal (1, 15) or a central controller (18).

4. Network device within a wireless network comprised of a number of directional antennas and having an omni-directional antenna, said network device being a first network device (1) and adapted to perform a transmit and receiving antenna diversity method with a second network device (15) of the wireless network, comprising the steps of:

using an omni-directional antenna (10) of the first network device (1) to transmit a calibration signal from the first network device (1) to the second network device (15);

identifying the best receiving antenna (x) of the second network device (15) by successively switching all directional antennas (21 to 28) and an omni-directional antenna (20) of the second network device (15) into its receiving path and respectively measuring the received signal quality, and setting said identified best receiving antenna (x) as transmit and receiving antenna of said second network device (15);

using the set transmit and receiving antenna (x) of said second network device (15) to transmit a calibration signal from the second network device (15) to the first network device (1); and identifying the best receiving antenna (y) of the first network device (1) by successively switching all directional antennas (11 to 14) and said onmi-directional antenna (10) of the first network device (1) into its receiving path and respectively measuring the received signal quality, and setting said identified best receiving antenna (y) as transmit and receiving antenna of said first network device (1).

5. Network device according to claim 4, characterized in that said omni-directional antenna (10; 20) thereof is built by a parallel connection of at least some of said directional antennas (11 to 14; 21 to 28).

6. Network device according to claim 5, characterized in that said omni-directional antenna (10; 20) thereof is built by a parallel connection of all of said directional antennas (11 to 14; 21 to 28).

* * * * *